Patented Mar. 2, 1926.

1,575,372

UNITED STATES PATENT OFFICE.

WHARTON B. McLAUGHLIN, OF NEW YORK, N. Y.; CELIA BROWN McLAUGHLIN ADMINISTRATRIX OF SAID WHARTON B. McLAUGHLIN, DECEASED.

METHOD OF FERMENTING OR CURING COCOA BEANS AND PRODUCT RESULTING FROM SUCH FERMENTATION OR CURING.

No Drawing. Application filed December 28, 1923. Serial No. 683,200.

*To all whom it may concern:*

Be it known that I, WHARTON B. McLAUGHLIN, citizen of the United States, and resident of city of New York, in the county of New York and State of New York, have invented certain new and useful Methods of Fermenting or Curing Cocoa Beans and Product Resulting from such Fermentation or Curing, of which the following is a specification.

This invention relates to methods of fermenting or curing cocoa beans and the product resulting from such fermentation or curing.

The object of the invention is to produce a bland cocoa bean and also to increase the weight of the output of fermented bean from a given weight of unfermented beans.

I accomplish this object by causing an autogenous hydrolosis of the astringent matters of the bean (which give it its normal purplish red color and somewhat acrid taste), uninfluenced by the presence of saccharomyces or oxygen.

As is well known, one of the objects of fermenting the cocoa beans is to cause a splitting up of certain indifferent organoleptic aromatogenic groups with the formation of aromatophore molecules. The attainment of this object is known practically by a change in color of the bean from a purplish red to a cinnamon brown and by the loss of its somewhat acrid flavor.

It has been and is universally believed that the presence of yeast and the enzymes formed by them is a necessary causative factor in the decomposition of the cocoa red in the bean.

It has also been claimed that an oxidase present in the bean plays an important part in this change and that the process was one of oxidation of the bitter astringent principles of the bean.

It is also well known that the loss of non-volatile bean substance during the fermentation approximates ten per cent (10%) in all of the methods of fermentation now known or used. This loss is probably due to the formation of volatile oxidation products which disappear before or at the time of drying the bean; this loss is manifested in the dried bean by a thinning of the cotyledons,—where the faces of the cotyledons are in juxtaposition the bean appears flattened, where the bean in drying shrinks but retains in general the contour of the green bean, the cotyledons will be found to be centrally separated with a space of considerable magnitude between them. These changes may be readily appreciated by comparing the dried fermented bean with a dried unfermented bean. In the latter, it will be found that the shrinkage in drying has been practically uniformly proportionate in all diameters and the bean in general retains the contour of the green bean, that the kernels fill the husk, giving the bean a feeling of weight and solidity.

I have discovered that these changes which modify the color and flavor of the cocoa bean take place without loss of bean substance when fresh supplies of oxygen are not available. As a scientific proposition, it is too early to say that the processes are not processes of oxidation, nor that the enzyme causing these changes is not an oxidase; while such is my opinion, it is not necessary to determine the fact in the practical application of my discovery.

I have found that if green cocoa beans, freshly removed from the pod, be placed in a vessel closed in such a manner that atmospheric air cannot have access to them, and maintained at a temperature above that at which yeast grow and below that at which the enzyme is injured for a period of five to seven days, the changes above noted take place in the bean and take place without loss of bean substance, the temperatures which I have used range between 120 and 130 Fahrenheit, but I have reason to believe that much higher temperatures may be used to advantage.

When the bean thus obtained is dried, it will be found to have retained in a large degree the contour of the green bean, it will appear fat and solid the kernels filling the husk, the cotyledons will not have that thinned appearance heretofore noted in fermented bean, but will have the cinnamon brown color and bland taste characteristic of the best fermented bean. In other words, this bean will have the general shape and appearance of a dried, unfermented bean with the kernels having the color and taste of the best fermented bean.

Having now described my invention, I claim:

1. The method of curing cocoa beans, which consists in maintaining the bean out of contact with atmospheric air at a temperature above that at which organized ferments grow and below that at which the enzyme of the bean is injured until the purplish red color of the bean changes to a reddish brown which upon drying becomes cinnamon brown.

2. An article of manufacture consisting of a dried fermented cocoa bean, having the general appearance so far as shape, fatness and solidity goes, of a dried unfermented cocoa bean, but differentiated from this bean by having a cinnamon brown color and a bland taste.

Signed at city of New York in the county of New York and State of New York this the 27th day of December, A. D., 1923.

WHARTON B. McLAUGHLIN.